Jan. 20, 1959

P. A. HOWARD 2,869,293

MOUNTING FOR PIPE END ABRADERS

Filed Dec. 19, 1956

Jan. 20, 1959 P. A. HOWARD 2,869,293
MOUNTING FOR PIPE END ABRADERS
Filed Dec. 19, 1956 2 Sheets-Sheet 2
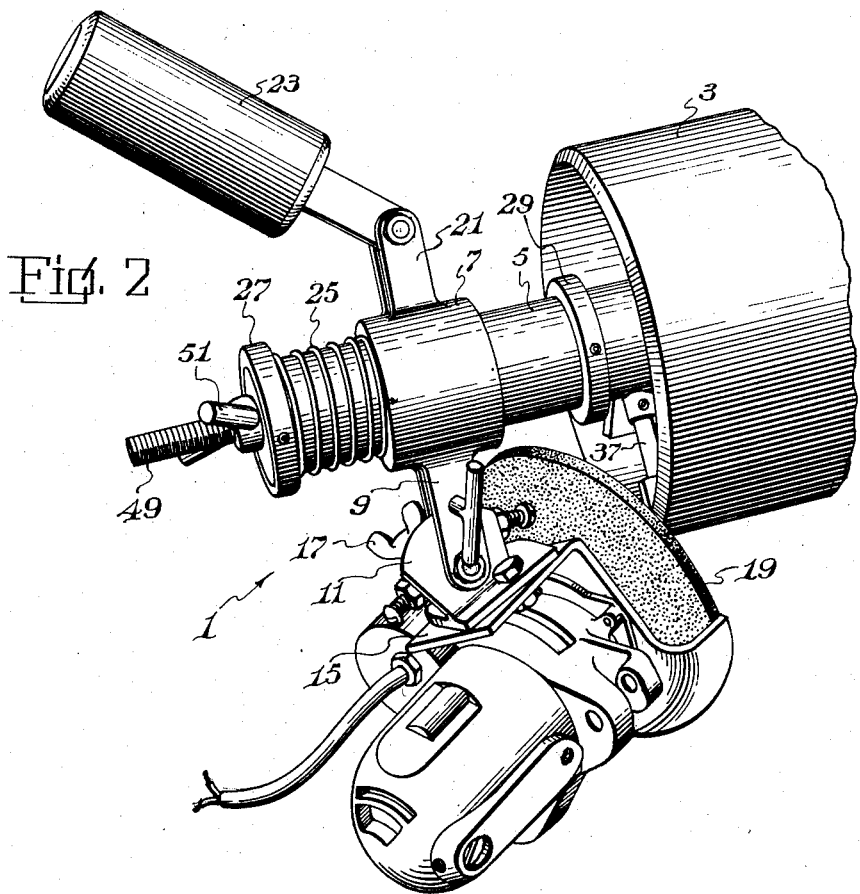
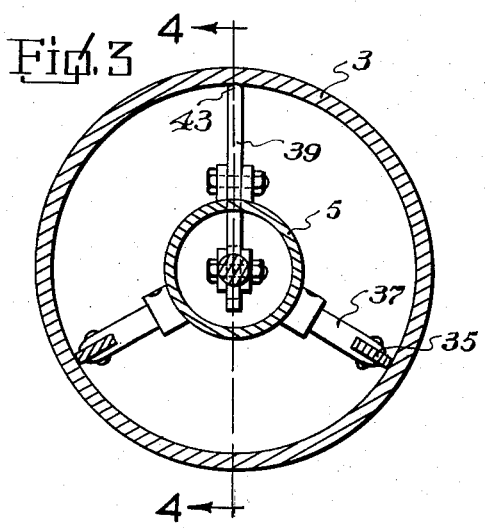
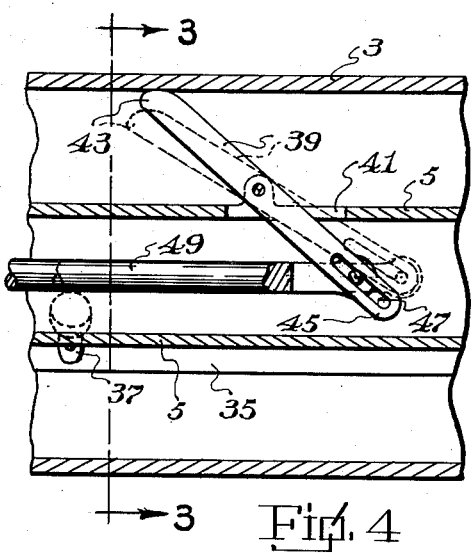

United States Patent Office 2,869,293
Patented Jan. 20, 1959

2,869,293

MOUNTING FOR PIPE END ABRADERS

Posy A. Howard, Tulsa, Okla.

Application December 19, 1956, Serial No. 629,311

5 Claims. (Cl. 51—241)

The present invention relates to mountings for pipe end abraders, and more particularly to such mountings designed to be locked in position relative to the pipe end to movably support an abrading device during preparation of the pipe end for welding to an adjacent pipe end.

Pipe lines and the like are commonly constructed by welding together a number of lengths of pipe. The pipe ends usually have a bevel, such that abutting ends will form between them an annular V-shaped groove for supporting the weld. Ordinarily, the pipe ends have an inner radial surface or land and an outer bevel. This configuration is most conveniently imparted to the pipe ends by abrading them; and the prior art has experienced great difficulty in imparting uniform configurations to pipe ends by means of the abrading devices known heretofore Accordingly, it is an object of the present invention to provide a mounting for a pipe end abrader, which will enable rapid and accurate abrasion of pipe ends to secure a desired configuration thereon.

Another object of the present invention is the provision of a mounting for pipe and abraders, such that the abrading device may be quickly set in the desired position of use, may be readily moved relative to the pipe end, and may be retained when desired in inoperative position.

The invention also contemplates the provision of a mounting for pipe end abraders, which may be quickly centered relative to, and firmly maintained coaxial with, the pipe end to be abraded.

Still another object of the invention is the provision of a mounting for pipe end abraders, which will be readily adaptable for use with pipes of different sizes.

Finally, it is an object of the present invention to provide a mounting for pipe and abraders, which will be relatively simple and inexpensive to manufacture, easy and accurate to operate, and rugged and durable in use.

Other objects and advantages of the present invention will become apparent from a consideration of the following specification, taken in conjunction with the accompanying drawings, in which:

Figure 2 is a view similar to Figure 1 but showing the abrading device rotated 180 degrees from the position of Figure 1;

Figure 3 is a transverse cross-sectional view through the pipe looking away from the abrading device;

Figure 4 is an elevational cross-sectional view taken on the line 4—4 of Figure 3.

Figure 1:
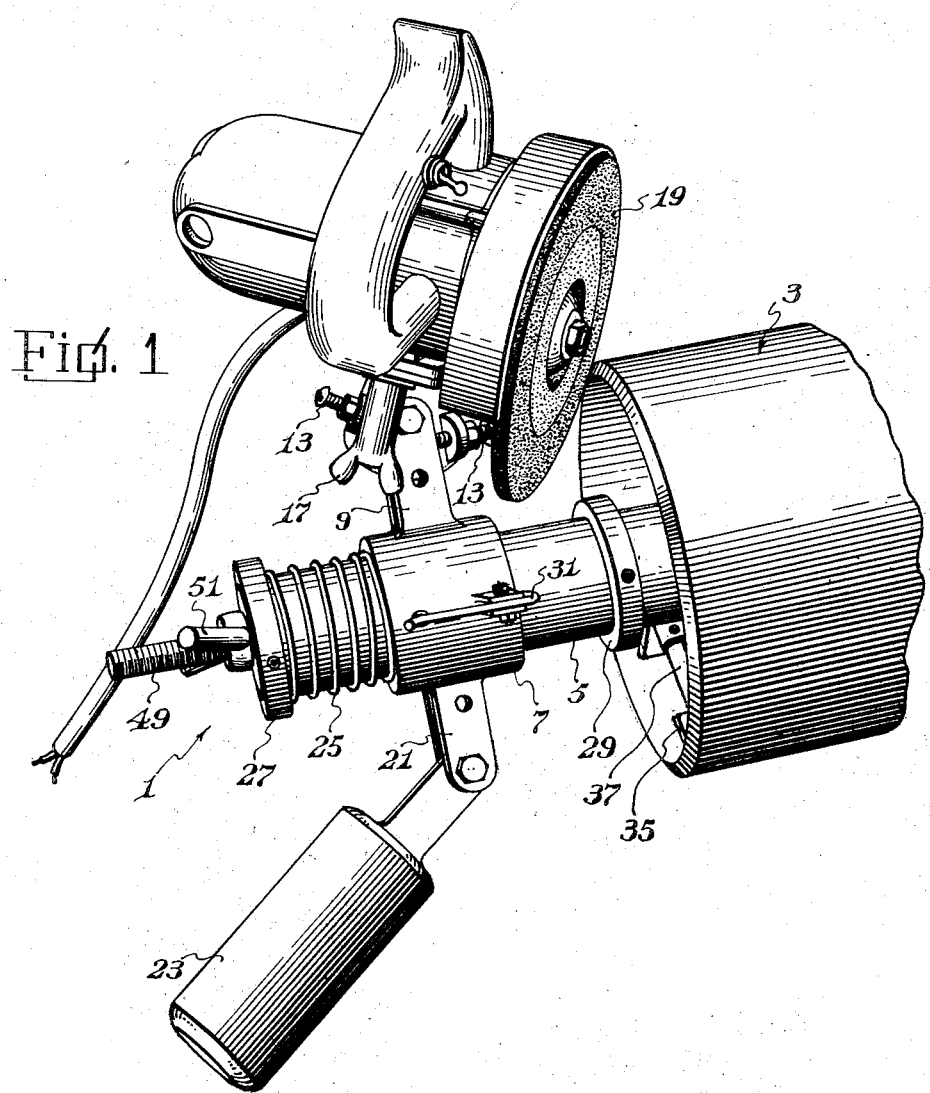
Figure 1 is a perspective view of a mounting for pipe end abraders according to the invention and showing the device of the invention in use.
Figure 5:
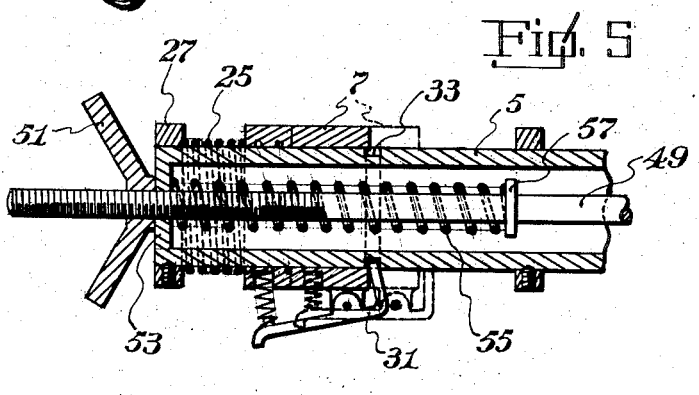
Figure 5 is a longitudinal cross-sectional view taken through the protruding end of the spindle.

Referring now to the drawings in greater detail, there is shown a mounting for a pipe end abrader, indicated generally at 1, and mounted in the end of a pipe 3. The mounting comprises a hollow tubular spindle 5 having a collar 7 mounted thereon for rotation and axial sliding movement. An outstanding clevis 9 extends radially from one side of collar 7 and carries between the outer ends of its arms the web of a T-shaped adjustment member 11 on which are mounted opposed set screws 13 acting on clevis 9 to hold adjustment member 11 in any of a plurality of positions of rotative adjustment relative to clevis 9 about a first axis passing through the web of member 11 and the outer ends of clevis 9. A supporting plate 15 is mounted on the flange of adjustment member 11 for rotation about a second axis relative to member 11 perpendicular to the first axis mentioned above; and wing nut 17 holds plate 15 in any of a plurality of positions of adjustment. Plate 15 supports a conventional abrading device 19, in this instance of the rotary disc type driven by an electric motor from a current source (not shown).

On the opposite side of collar 7 from clevis 9 is an outstanding clevis 21 carrying between the outer ends of its arms a pivoted counterweight 23. It will be obvious that abrading device 19 may be adjusted to any angular position about its two axes of rotation on collar 7; and correspondingly, counterweight 23 may be adjusted radially inwardly and outwardly exactly to balance abrading device 19 in any of its adjusted positions.

Collar 7, and hence abrading device 19, is resiliently urged toward the pipe end to be abraded by a coil compression spring 25 disposed about spindle 5 and acting between collar 7 and a fixed thrust collar 27 on the outer end of spindle 5. Inwardly, a fixed limiting collar 29 prevents excessive inward movement of collar 7 such as might otherwise damage a finished pipe end. A retracted or rest position for the abrading device is provided by detent means comprising a spring-urged pivotally mounted locking pawl 31 which is mounted on the collar 7 and which is selectively engageable in an annular locking groove 33 extending entirely about the outer face of spindle 5.

Means for mounting spindle 5 coaxially in pipe 3 with an end of spindle 5 protruding from the end of the pipe to be abraded are provided, comprising a pair of elongated supporting members 35 mounted on but spaced from spindle 5 by means of legs 37. Supporting members 35 are parallel to spindle 5 and to each other, and are detachably connected to legs 37 so that members 35 of various sizes can be used in connection with pipes of various diameters. For the same purpose, legs 37 are detachably connected to spindle 5. A third supporting member is mounted on spindle 5, comprising a centralizing lever 39 pivotally mounted on spindle 5 and extending through longitudinal slot 41 in spindle 5, with one end 43 outside spindle 5 and the other end 45 inside spindle 5. End 45 has a longitudinal slot 47 therethrough. A rod 49 has sliding connection at one end within slot 47. Rod 49 is within spindle 5 and is screw-threaded at its other end and extends endwise outwardly beyond the outer protruding end of spindle 5. A screw-threaded wing nut 51 is rotatable on the screw-threaded end of rod 49 and abuts and acts endwise against an annular abutment shoulder 53 formed on the outermost end of spindle 5. A coil compression spring 55 within spindle 5 and encircling rod 49 acts between abutment shoulder 53 and an annular abutment shoulder comprising a washer 57 integral with rod 49, to urge rod 49 into spindle 5, thereby to urge lever 39 toward the dotted line position shown in Figure 4.

In operation, mounting 1 is slipped into the end of pipe 3 to be abraded and wing nut 51 turned to draw rod 49 endwise outwardly of spindle 5 and move lever 39 into the full line position shown in Figure 4, in which end 43 of lever 39 will press against the inner surface of pipe 3 thereby locking the mounting coaxially in the pipe.

Adjustment member 11 and supporting plate 15 are adjusted about their respective axes until abrading device 19 is properly oriented to form a bevel of the proper angle on the end of the pipe to be abraded. Counterweight 23 is swung until it balances abrading device 19 in this adjusted position. Spring 25 urges abrading device 19 against the pipe end; and when the abrading device is in operation, it may be merely swung around the axis of spindle 5 to grind the desired bevel. After the bevel is cut, it is obvious that an adjustment of the angle of abrading device 19 can be made to cut a land on the end of the inner periphery of the bevel.

In between these two operations, or after the abrading operation is finally completed, the abrading device may be merely pulled rearwardly; and at a certain point, pawl 31 will spring and lock into groove 33, no matter what position collar 7 may be in. In this way, the abrading device is held out of contact with the finished pipe end during adjustment or dismounting.

To remove the mounting from the pipe end, wing nut 51 is merely turned in the opposite direction, thereby disengaging end 43 of lever 39 under influence of spring 55.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A mounting for a pipe end abrader, comprising in combination a spindle, means for mounting said spindle coaxially in a pipe with an end of said spindle protruding from the end of the pipe to be abraded, a collar mounted for rotation and axial sliding movement on said end of said spindle, a pair of radially outwardly extending clevis arms on said collar, a member having a web and a flange perpendicular to each other, means mounting the web between said arms for rotation relative to said arms about a first axis perpendicular to and passing through the web and spaced from the axis of the collar, a supporting plate for supporting an abrading device, and means mounting the supporting plate on the side of the flange opposite the web for rotation relative to the flange about a second axis perpendicular to said first axis.

2. A mounting for a pipe end abrader, comprising in combination a spindle, means for mounting said spindle coaxially in a pipe with an end of said spindle protruding from the end of the pipe to be abraded, a collar mounted for rotation and axial sliding movement on said end of said spindle, means for mounting an abrading device on said collar, means resiliently urging said collar toward said pipe, said spindle having an indentation in its outer periphery, and detent means on said collar selectively engageable in said indentation to hold said collar in a retracted position.

3. A mounting for a pipe end abrader as claimed in claim 2, said indentation being annular and extending entirely about the spindle.

4. A mounting for a pipe end abrader, comprising in combination a hollow spindle, means for mounting said spindle in a pipe with an end of said spindle protruding from the end of the pipe to be abraded, said means comprising a pair of elongated supporting members mounted on and spaced from and parallel to said spindle and a third supporting member comprising a lever pivotally mounted on said spindle with one end outside said spindle and the other end inside said spindle, means inside said spindle having connection with said other end of said lever for pivoting said lever to move said one end of said lever selectively away from or toward said spindle to lock said spindle coaxially in said pipe between said three supporting members or to release said spindle, respectively, and means for mounting an abrading device on said protruding end of said spindle.

5. A mounting for a pipe end abrader as claimed in claim 4, in which said means inside said spindle comprises a rod having sliding connection at one end with a slot in said other end of said lever, said rod at its other end having screw threads and extending endwise outwardly beyond said end of said spindle, and a screw-threaded tightening nut on said other end of said rod acting endwise against said end of said spindle.

References Cited in the file of this patent

UNITED STATES PATENTS

| | | |
|---|---|---|
| 1,326,091 | Porter | Dec. 23, 1919 |
| 1,823,959 | Steinmayer | Sept. 22, 1931 |
| 2,188,720 | McQuade | Jan. 30, 1940 |
| 2,414,731 | Forbes | Jan. 21, 1947 |
| 2,587,398 | Smith | Feb. 26, 1952 |